United States Patent [19]
Gee

[11] Patent Number: 5,852,110
[45] Date of Patent: Dec. 22, 1998

[54] METHOD FOR MAKING AMINO FUNCTIONAL POLYSILOXANE EMULSIONS

[75] Inventor: Ronald Paul Gee, Midland, Mich.

[73] Assignee: Dow Corning Corporation, Midland, Mich.

[21] Appl. No.: 668,797

[22] Filed: Jun. 24, 1996

[51] Int. Cl.[6] .................................................... C08L 83/08
[52] U.S. Cl. .......................... 524/837; 524/714; 524/724
[58] Field of Search ..................................... 524/837, 714, 524/724

[56] References Cited

U.S. PATENT DOCUMENTS

| | | | |
|---|---|---|---|
| 2,891,920 | 6/1959 | Hyde et al. | 260/29.2 |
| 4,784,665 | 11/1988 | Ona et al. | 8/115.6 |
| 4,999,398 | 3/1991 | Graiver et al. | 524/837 |

FOREIGN PATENT DOCUMENTS 0459500  5/1991  European Pat. Off. ........ C08G 77/10

OTHER PUBLICATIONS

"A Method For Estimating Both The Solubility Parameters and Molar Volumes of Liquids" Robert F. Fedors, Polymer Engineering And Science, Feb. 1974 vol. 14 No. 2 pp. 147–154.

Primary Examiner—Patricia A. Short
Attorney, Agent, or Firm—Sharon K. Severance

[57] ABSTRACT

The instant invention pertains to a method for making amino-functional polysiloxane emulsions wherein said method comprises the emulsion polymerization of a mixture comprising cyclosiloxanes and an aminosilane having an amino-functional group solubility parameter equal to or less than 10.0. Said emulsion polymerization is carried out in the presence of water, at least one cationic surfactant and a basic polymerization catalyst. By using an aminosilane having an amino-functional group solubility parameter of equal to or less than 10.0 it is possible to produce emulsions with higher amine concentrations in the resulting polymer.

26 Claims, No Drawings

METHOD FOR MAKING AMINO FUNCTIONAL POLYSILOXANE EMULSIONS

BACKGROUND OF THE INVENTION

Numerous methods for making polysiloxane emulsions are known in the art. These methods are generally classified in two categories: mechanical methods and emulsion polymerization methods. Mechanical methods emulsify the polysiloxane in water by using homogenizers or other vigorous agitation means. Typically a surfactant is added to the polysiloxane and water to aid the emulsification process. When employing mechanical emulsification, the polysiloxane does not undergo any reactions during the emulsification.

Emulsion polymerization methods comprise reacting a cyclosiloxane in the presence of a catalyst, surfactant and water. During the reaction period there may be some form of agitation to provide adequate heat transfer for uniform temperature and to maintain uniform dispersion of the reactants. In emulsion polymerization, combinations of cyclosiloxanes and reactive monomers or oligomers may be used to form copolymers in the resulting emulsion. Mechanical pre-emulsification of the silicone reactants may be used in emulsion polymerization methods.

U.S. Pat. No. 4,999,398 to Graiver et al., U.S. Pat. No. 4,784,665 to Ona et al. and EP Patent Application No. 0 459 500 to Gee disclose methods of making polysiloxane emulsions by emulsion polymerization wherein the polysiloxane can be an amino-functional polysiloxane. These all describe the use of small quantities of N-(2-aminoethyl)-3-aminopropyltrimethoxysilane in conjunction with nonfunctional cyclosiloxanes to produce copolymeric amino-functional polysiloxane emulsions.

It has been found that N-(2-aminoethyl)-3-aminopropyltrimethoxysilane and cyclosiloxanes do not completely copolymerize when the emulsions are produced by emulsion polymerization thus leaving a significant percentage of the aminosilane in the aqueous phase. It has now been found that the emulsion copolymerization of an aminosilane with the cyclosiloxanes is greatly improved when an aminosilane with an amino-functional group ($R^*$ group) solubility parameter of less than or equal to 10.0 is used. The use of these aminosilanes result in a more efficient incorporation of the aminosilane into the copolymer and correspondingly a significantly higher amount of the amine functionality in the resulting polymer.

It is therefore an object of this invention to provide a method for producing aminosiloxane emulsions by the emulsion polymerization of a mixture comprising cyclosiloxanes and an aminosilane having an amino-functional group ($R^*$ group) solubility parameter equal to or less than 10.0.

SUMMARY OF THE INVENTION

The instant invention pertains to a method for making amino-functional polysiloxane (aminosilicone) emulsions wherein said method comprises the emulsion polymerization of a mixture comprising cyclosiloxanes and an aminosilane having an amino-functional group ($R^*$ group) solubility parameter equal to or less than 10.0. Said emulsion polymerization is carried out in the presence of water, at least one cationic surfactant and a basic polymerization catalyst. By using an aminosilane having an $R^*$ group solubility parameter of equal to or less than 10.0 it is possible to more efficiently incorporate the aminosilane units into the copolymer and produce emulsions with higher amine concentrations in the resulting polymer.

THE INVENTION

The instant invention pertains to a method of making amino-functional polysiloxane emulsions having increased concentrations of amine functionality in the resulting polymer. The emulsions of the instant invention are produced by the emulsion polymerization of a cyclosiloxane and an aminosilane having an amino-functional group ($R^*$ group) solubility parameter of equal to or less than 10.0 in the presence of water, at least one cationic surfactant and a basic polymerization catalyst.

By the term "emulsion" used herein it is meant micro-, fine and standard emulsions. Microemulsions are typically characterized as those emulsions having a particle size of less than 140 nm, preferably less than 100 nm, and visually appear translucent to transparent (transmitting light without distortion). Fine emulsions are characterized as those emulsions having a particle size from 140 to 300 nm and which visually may be opaque to very slightly translucent (transmitting light but with distortion). Standard emulsions are characterized as those emulsions having a particles size of greater than 300 nm and which visually have an intense white appearance. Although all the above types of emulsions may be produced by the method of the instant invention, it is preferred to produce fine and microemulsions due to their commercial utility.

Any method known in the art for producing copolymer emulsions by emulsion polymerization can be used to produce the emulsions of the instant invention. For Example, U.S. Pat. No. 4,999,398 to Graiver et al., hereby incorporated by reference for the teaching of the emulsion polymerization method, describes a method for making copolymer emulsions wherein the method comprises adding at an effective rate to a polymerization catalyst medium a standard emulsion comprised of polydiorganosiloxane precursor, surfactant and water. The polydiorganosiloxane precursor is comprised of cyclosiloxanes and up to 10 mole percent of other hydrolyzable silanes or oligomers.

EP Patent Application No. 0 459 500 to Gee discloses a method for making standard, fine and microemulsions of copolymers wherein the method comprises combining together at least one siloxane oligomer, cationic or anionic surfactant, nonionic surfactant, catalyst and water and thereafter emulsifying and polymerizing the mixture. The siloxane oligomer comprises cyclosiloxanes and up to 10 mole percent of a siloxane reactant that contains a hydrolyzable or silanol group.

Other methods known in the art, although they do not disclose copolymerization, such as those disclosed in U.S. Pat. No 2,891,920 to Hyde et al. may be used to produce emulsions herein.

The emulsions of the instant invention are produced by copolymerizing a cyclosiloxane and an aminosilane having an $R^*$ group solubility parameter of equal to or less than 10.0.

Cyclosiloxanes useful in the instant invention are of the general formula

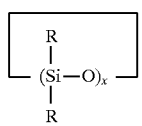

wherein each R is independently selected from a saturated or unsaturated hydrocarbon group consisting of 1 to 6 carbon atoms and an aryl group consisting of 6 to 10 carbon atoms;

and x has a value of 3 to 7. R may be further exemplified by, but not limited to, methyl, ethyl, propyl, phenyl, allyl, and vinyl.

The cyclosiloxane useful in the instant invention may be exemplified by, but not limited to, compounds such as hexamethylcyclotrisiloxane, octamethylcyclotetrasiloxane, decamethylcyclopentasiloxane, tetramethyltetravinylcyclotetrasiloxane, tetramethyltetraphenylcyclotetrasiloxane, and others. The cyclosiloxane may be a single oligomer or a mixture thereof. Preferably the cyclosiloxane is a mixture comprised primarily of octamethylcyclotetrasiloxane, there also being present hexamethylcyclotrisiloxane and decamethylcyclopentasiloxane.

Aminosilanes useful in the instant invention are aminosilanes having a amine-functional group ($R^*$) solubility parameter of $\leq 10.0$, preferably $\leq 9.8$, more preferably $\leq 9.7$. The aminosilanes useful in the instant invention may be exemplified by aminosilanes of the formulae:

$$R^*SiR^1{}_y(OR^2)_{3-y} \quad (I)$$

and

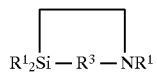

$$R^1{}_2Si—R^3—NR^1 \quad (II)$$

and wherein $R^*$ is an amine functional group (in formula (II) —$R^3NHR^1=R^*$); $R^1$ is independently selected from an alkyl group having from 1 to 6 carbon atoms and an aryl group having from 6 to 10 carbon atoms; $R^2$ is an alkyl group having from 1 to 4 carbon atoms; and $R^3$ is an alkylene group having from 2 to 10 carbon atoms and y has a value of 0 to 2.

$R^1$ may be exemplified by, but not limited to methyl, ethyl, and phenyl. $R^2$ may be exemplified by methyl and ethyl. $R^3$ may be exemplified by ethylene, propylene, isobutylene and others.

In the formula (II) the solubility parameter is calculated based on the structure —$R^3NHR^1$, which is the amine group produced upon the opening of the ring structure.

In the above formulas $R^*$ may be exemplified by, but not limited to $R^4{}_zH_{2-z}N—R^3—$, $R^1{}_zH_{2-z}N—R^3N(R^5)R^3—$ and —$R^3NHR^1$ wherein $R^3$ is as described above; $R^4$ is selected from the group consisting of alkyl groups having from 1 to 4 carbon atoms and cycloalkyl groups having from 3 to 10 carbon atoms; $R^5$ is selected from an alkyl group having from 1 to 4 carbon atoms and hydrogen; and z has a value of 0 to 2. $R^*$ may be exemplified by, but not limited to $CH_3NHCH_2(CH_3)CHCH_2—$, $H_2N(CH_2)_3—$, $H_2NCH_2CH_2NHCH_2(CH_3)CHCH_2—$, $H_2N(CH_2)_6NHCH_2CH_2CH_2—$, and $C_6H_{11}HNCH_2CH_2CH_2—$.

The $R^*$ group solubility parameter is calculated by the formula $$\delta = \left[ \frac{\sum_i \Delta e_i}{\sum_i \Delta v_i} \right]^{1/2}$$

wherein $\delta$ is the solubility parameter; $e_i$ is the energy of vaporization, and $v_i$ is the molar volume. Atomic and group contributions to the energy of vaporization and the molar volume are known in the art and can be found in Table 5 of R. Fedors, "A Method For Estimating Both the Solubility Parameters and Molar Volumes of Liquids", Polymer and Engineering Science, Vol. 14(2), p. 147–154 (2/74).

Aminosilanes useful in the instant invention may be exemplified by, but not limited to aminopropyltrimethoxysilane ($R^*=9.8$), aminopropylmethyldiethoxysilane ($R^*=9.8$), aminoethylaminoisobutylmethyldimethoxysilane ($R^*=9.8$), aminohexylaminopropylmethyldimethoxysilane ($R^*=9.5$), N-(cyclohexyl)aminopropylmethyldimethoxysilane ($R^*=9.2$), and 1,1,2,4-tetramethyl-1-sila-2-azacyclopentane ($R^*=8.5$), and others. Aminodialkoxysilanes and monosiloxyaminofunctional silanes are preferred in the instant invention. It should be noted that the $R^*$ for and 1,1,2,4-tetramethyl-1-sila-2-azacyclopentane is calculated based upon the structure —$CH_2CH(CH_3)CH_2NHCH_3$ and not on the closed ring structure.

Typically the aminosilane is present in an amount of 0.1 to 10 wt % based on the total weight of the emulsion composition, preferably from 0.25 to 5 wt %.

The emulsions produced by the method of this invention typically contain an amino-functional polysiloxane polymer concentration of 10 to 70 weight percent based on the total emulsion. The preferred level is from 25 to 60 weight percent based on the total weight of the emulsion. The larger the particle size, the higher the concentration of polysiloxane the emulsion may contain. Emulsions that contain less than 10 weight percent silicone concentration may be produced however, these emulsions typically have no commercial application.

The cyclosiloxanes and aminosilanes are emulsion polymerized in the presence of at least one cationic surfactant and a polymerization catalyst. Any basic catalyst capable of copolymerizing the cyclosiloxane and aminosilane in the presence of water is useful in the method of the instant invention. Catalysts for the reaction include those catalysts which are known as condensation polymerization catalysts and are capable of cleaving siloxane bonds. Such catalysts are known in the art and include, but are not limited to, strong bases such as quaternary ammonium hydroxides and metal hydroxides. Other useful catalytic systems include phase transfer catalysts such as tetrabutyl ammonium hydroxide or ion exchange resins whereby a catalyst may be formed in situ. In some instances the surfactant will function as both the surfactant and catalyst. For example, cetyltrimethylammonium hydroxide can function as both a cationic surfactant and a catalyst in emulsion polymerization. It has been found that strong acids are not suitable for catalysts in the instant invention.

The catalyst is present in the reaction medium usually at levels of 0.01 to 30 percent by weight of the total silicone. Typically the basic metal hydroxides can be used within the lower end of this range while the ionic surfactants/catalysts will be used at the higher end of this range.

The reaction medium must further comprise at least one cationic surfactant and optionally a nonionic surfactant. Any cationic surfactant known in the art and useful in stabilizing emulsions produced by emulsion polymerization are useful in the instant invention.

Cationic surfactants useful in the method of the instant invention are those known in the art. The cationic surfactants include various fatty acid amines and amides and their derivatives, and the salts of the fatty acid amines and amides. The cationic surfactants useful in the instant invention can be further exemplified by, but are not limited to aliphatic fatty amines and their derivatives such as dodecylamine acetate, octadecylamine acetate and acetates of the amines of tallow fatty acids; homologues of aromatic amines having fatty chains such as dodecylanalin; fatty amides derived from aliphatic diamines such as undecylimidazoline; fatty amides derived from disubstituted amines such as oleylaminodiethylamine, derivatives of ethylene diamine;

quaternary ammonium compounds such as tallow trimethyl ammonium chloride, dioctadecyldimethyl ammonium chloride, didodecyldimethyl ammonium chloride and dihexadecyldimethyl ammonium chloride; amide derivatives of amino alcohols such as beta-hydroxyethylsteraraylamide; amine salts of long chain fatty acids; quaternary ammonium bases derived from fatty amides of di-substituted diamines such as oleylbenzylaminoethylene diethylamine hydrochloride; quaternary ammonium bases of the benzimidazolines such as methylheptadecyl benzimidazol hydrobromide; basic compounds of pyridinium and its derivatives such as cetylpyridinium chloride; sulfonium compounds such as octadecylsulfonium methyl sulfate; quaternary ammonium compounds of betaine such as betaine compounds of diethylamino acetic acid and octadecylchloromethyl ether; urethanes of ethylene diamine such as condensation products of stearic acid and diethylene triamine; polyethylene diamines; and polypropanolpolyethanol amines.

Cationic surfactants commercially available and useful in the instant invention include, but are not limited to ARQUAD T27W, ARQUAD 16-29, ARQUAD C-33, ARQUAD T50 and ETHOQUAD T/13 ACETATE, all manufactured by Akzo Chemie.

A nonionic surfactant may be present in addition to the above described cationic surfactant. Nonionic surfactants useful in the method of the instant invention are those that have a hydrophilic-lipophilic balance (HLB) between 10 and 20. Nonionic surfactants with an HLB of less than 10 may be used in the instant invention, however, in the case of microemulsions, a hazy solution may result due to the limited solubility of the nonionic surfactant in water. It is preferred that when using a nonionic surfactant with an HLB of less than 10, that a nonionic surfactant with an HLB of greater than 10 also be used.

The nonionic surfactants useful in the method of the instant invention can be exemplified by, but not limited to, 2,6,8-trimethyl-4-nonyloxypolyethylene oxyethanol (6EO); 2,6,8-trimethyl-4-nonyloxypolyethylene oxyethanol (10EO); alkyleneoxypolyethyleneoxyethanol ($C_{11-15}$, secondary alkyl, 7EO); alkyleneoxypolyethyleneoxyethanol ($C_{11-15}$, secondary alkyl, 9EO); alkyleneoxypolyethyleneoxyethanol ($C_{11-15}$, secondary alkyl, 15EO); octylphenoxy polyethoxy ethanol (40EO); and nonylphenoxy polyethoxy ethanol (10EO); tridecyl poly-12-oxyethylene.

Nonionic surfactants commercially available include TERGITOL TMN-6, TERGITOL TMN-10, TERGITOL 15-S-7, TERGITOL 15-S-9, TRITON X405 all manufactured by Union Carbide Corporation; MAKON 10 manufactured by Stepan Co.; and RENEX manufactured by ICI Chemicals.

There are also commercially available surfactants that have the characteristics of both ionic and nonionic surfactants. For example, ETHOQUAD 18/25 (methylpolyoxyethylene (15) octadecylammonium chloride) sold by Akzo Chemie is a cationic quaternary ammonium salt with polyethyleneoxide tails.

The surfactant is typically present at levels of 0.05 to 30 weight percent based on the total weight of the emulsion. The preferred levels are from 0.5 to 10 weight percent based on the total weight of the emulsion.

Water is also present in the emulsions as the continuous phase. Typically, enough water is present to give a amino-functional polysiloxane polymer concentration of 10 to 70 wt % in the final emulsion.

Following the completion of the polymerization reaction a neutralizing agent may be added to neutralize the catalyst and prevent further polymerization. Since the catalyst is basic, preferably an acidic neutralizing agent should be used. The neutralizing agent should be added in an amount to neutralize the catalyst without creating an excess which may have a catalytic effect.

Additional components such as additional surfactants, preservatives, colorants, and others may be added to the emulsion.

The emulsions produced by the method of the instant invention may be used in any application known for the use of amino-functional polysiloxane emulsions. For example, the emulsions may be used in hair care applications, treatment of textiles and in auto care applications.

So that those skilled in the art can understand and appreciate the invention taught herein, the following examples are presented, it being understood that these examples should not be used to limit the scope of this invention found in the claims.

Polymer Isolation

In the following examples the polymers were isolated from the emulsion by dissolving 1.5 g of $CaCl_2$ in a 10 g sample of the emulsion, followed by the addition of 20 ml of methanol and 25 g of pentane. The mixture was shaken briefly and transferred to a centrifuge tube and centrifuged for 15 minutes at 3000 rpm. The top pentane layer was removed with a disposable pipette, placed in an aluminum moisture dish and allowed to evaporate overnight. The residual volatiles were then removed by vacuum at 10 mm Hg for 20 minutes.

Polymer Amine Content

Amine content (milliequivalents per gram polymer) was determined on polymers isolated from the emulsions by titrating with perchloric acid in an anhydrous environment. One gram of the amino-functional polysiloxane polymer was weighed into a 150 ml beaker. One hundred ml of concentrated HOAc was added to dissolve the sample. 3 to 5 drops of an indicator was added. The solution was then titrated with $HClO_4$ solution to the endpoint. Amine milliequivalents/gram was then calculated by:

$$\frac{\text{(volume } HClO_4\text{) (N } HClO_4\text{)}}{\text{(sample weight, g)}}$$

Aminosilanes
Amine #1 is $H_2N(CH_2)_3Si(OCH_3)_3$
Amine #2 is $H_2N(CH_2)_3SiCH_3(OCH_2CH_3)_2$
Amine #3 is $H_2NCH_2CH_2NHCH_2(CH_3)CHCH_2SiCH_3(OCH_3)_2$
Amine #4 is $H_2N(CH_2)_6NHCH_2CH_2CH_2SiCH_3(OCH_3)_2$
Amine #5 is $C_6H_{11}HNCH_2CH_2CH_2SiCH_3(OCH_3)_2$
Amine #6 is

$CH_3NCH_2(CH_3)CHCH_2Si(CH_3)_2$

Comparative Amine #1 is $H_2NCH_2CH_2NHCH_2CH_2CH_2Si(OCH_3)_3$

EXAMPLE 1

To a 1 liter, 3-necked round bottom flask were added 283.50 g of water, 19.60 g of RENEX 30 (tridecyl poly-12-oxyethylene) and 12.81 g of Arquad 16-29 (cetyltrimethylammonium chloride). The flask was then fitted with a glass rod/teflon paddle stirrer, reflux condenser, heating mantle and thermocouple attached to a temperature controller. The contents of the flask were stirred to dissolve the surfactants. The stirrer was set to approximately 300 RPM and 245 g of a mixture of cyclosiloxanes comprising approximately 96 wt % octamethylcyclotetrasiloxane, 4 wt % decamethylcyclopentasiloxane and a trace of hexamethylcyclotrisiloxane was added to the flask and heated to 90° C. When the temperature was stable, the aminosilane (see Table 1 for type and amounts), 2.8 g of 50% NaOH and 3.5 g of water were added. The flask was held at 90° C. with stirring for 6 hours. The reaction was neutralized by adding 2.31 g of acetic acid diluted in 14.84 g of water. When the temperature had cooled below 50° C., 107.38 g of water and 0.21 g of KATHON GC (biocide) were added. Results are in Table 1.

TABLE 1

Results from Example 1

| Amino-silane | $R^-$ Solubility Parameter | Amount (wt % of total emulsion) | Actual Amine Milli-Equivalents (meq/g) | % Amine in Polymer | Average Particle Size (nm) |
|---|---|---|---|---|---|
| Amine #1 | 9.8 | 0.25 | 0.025 | 55.5 | 123 |
|  |  | 0.5 | 0.047 | 52.4 | 147 |
|  |  | 0.65 | 0.077 | 66.2 | 163 |
|  |  | 0.75 | 0.085 | 63.5 | 170 |
|  |  | 1.0 | 0.098 | 55.2 | 198 |
| Amine #2 | 9.8 | 0.25 | 0.033 | 78.3 | 137 |
|  |  | 0.5 | 0.076 | 90.7 | 179 |
|  |  | 0.75 | 0.090 | 72.1 | 202 |
|  |  | 1.0 | 0.121 | 73.1 | 218 |
| Amine #3 | 9.8 | 0.25 | 0.033 | 45.1 | 145 |
|  |  | 0.5 | 0.102 | 70.1 | 210 |
|  |  | 0.65 | 0.135 | 71.7 | 213 |
|  |  | 0.75 | 0.142 | 65.5 | 217 |
|  |  | 1.0 | 0.189 | 65.8 | 190 |
| Amine #4 | 9.5 | 0.65 | 0.128 | 81.0 | 185 |
| Amine #5 | 9.2 | 0.65 | 0.065 | 76.8 | 131 |
| Comparison Amine #1 | 10.2 | 0.25 | 0.036 | 49.6 | 108 |
|  |  | 0.5 | 0.036 | 24.9 | 137 |
|  |  | 0.65 | 0.039 | 20.8 | 141 |
|  |  | 0.75 | 0.064 | 29.7 | 137 |
|  |  | 1.0 | 0.110 | 38.5 | 183 |

EXAMPLE 2

This example shows the effect of addition rate and time of addition of the aminosilane on the polymerization.

The same procedure was used as in Example 1 except the reaction temperature was 95° C. and the silane feed began 1 hour after the NaOH catalysis and the silane was fed into the reactor over a one hour period. The amount of silane (Table 2) added in each case was fixed at a theoretical one mole percent level. The reaction was carried out for 23 hours with samples taken periodically to measure polymer amine content. The polymer amine content was found to be constant from 2 to 23 hours. The calculated copolymerization results shown in Table 2 are at approximately 6 hours reaction time.

TABLE 2

Results from Example 2

| Aminosilane | $R^-$ Solubility Parameter | Amount (wt % of total emulsion) | Theoretical Amine Milli-Equivalents (meq/g) | Actual Amine Milli-Equivalents (meq/g) | % Amine in Polymer | Average Particle Size (nm) |
|---|---|---|---|---|---|---|
| Amine #1 | 9.8 | 0.84 | 0.150 | 0.087 | 58.1 | 152 |
| Amine #2 | 9.8 | 0.9 | 0.149 | 0.103 | 69.0 | 162 |
| Amine #3 | 9.8 | 1.05 | 0.301 | 0.173 | 57.4 | 155 |
| Amine #5 | 9.2 | 1.15 | 0.148 | 0.128 | 86.5 | 155 |
| Amine #6 | 8.5 | 0.65 | 0.144 | 0.119 | 82.6 | 187 |
| Comparison Amine #1 | 10.2 | 1.04 | 0.297 | 0.083 | 28.0 | 153 |

EXAMPLE 3

This example shows the production of amino-functional polysiloxane microemulsions.

To a 1 liter, 3-necked round bottom flask were added 490.0 g of water, 84.0 g of RENEX 30 (tridecyl poly-12-oxyethylene) and 238.0 g of Arquad 16-29 (cetyltrimethylammonium chloride). The flask was then fitted with a glass rod/teflon paddle stirrer, reflux condenser, heating mantle and thermocouple attached to a temperature controller. The contents of the flask were stirred to dissolve the surfactants. The stirrer was set to approximately 300 RPM and 387.24 g of a mixture of cyclosiloxanes comprising approximately 96 wt % octamethylcyclotetrasiloxane, 4 wt % decamethylcyclopentasiloxane and a trace of hexamethylcyclotrisiloxane were added. The contents were heated to 80° C. When the temperature was stable, 4.2 g of 50% NaOH and 6.3 g of water were added to the flask and 7.84 g of the aminosilane (see Table 3 for type) mixed with 28 g of the cyclosiloxane was fed in over 30 minutes. The flask was held at 80° C. with stirring for 6 hours. Five (5) 25 g samples were removed over the 6 hour time for polymerization analysis. The reaction was neutralized by adding 5.15 g of acetic acid diluted in 18.41 g of water. When the temperature had cooled below 50° C., 118.07 g of water and 0.39 g of KATHON GC (biocide) were added. Results are in Table 3.

TABLE 3

Results from Example 3

| Aminosilane | $R^-$ Solubility Parameter | Amount (wt % of total emulsion) | Actual Amine Milli-Equivalents (meq) | % Amine in Polymer | Average Particle Size (nm) |
|---|---|---|---|---|---|
| Amine #5 | 9.2 | 0.56 | 0.079 | 91.8 | 35 |
| Comparison Amine #1 | 10.2 | 0.56 | 0.082 | 43.1 | 36 |

What is claimed is:

1. A method for producing amino-functional polysiloxane emulsions comprising emulsion polymerization of a mixture comprising at least one cyclosiloxane and at least one aminosilane having an amino-functional group solubility parameter equal to or less than 10.0; wherein said emulsion polymerization is carried out in the presence of water, at least one cationic surfactant and a basic emulsion polymerization catalyst.

2. The method as claimed in claim 1 wherein the amino-functional group solubility parameter is equal to or less than 9.8.

3. The method as claimed in claim 1 wherein the amino-functional group solubility parameter is equal to or less than 9.7.

4. The method as claimed in claim 1 wherein the cyclosiloxane is selected from cyclosiloxanes of the general formula

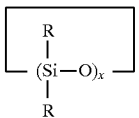

wherein each R is independently selected from saturated or unsaturated hydrocarbon group consisting of 1 to 6 carbon atoms and aryl groups consisting of 6 to 10 carbon atoms; and x has a value of 3 to 7.

5. The method as claimed in claim 4 wherein the cyclosiloxane is a mixture comprised primarily of octamethylcyclotetrasiloxane, there also being present hexamethylcyclotrisiloxane and decamethylcyclopentasiloxane.

6. The method as claimed in claim 1 wherein the aminosilane is selected from the group consisting of aminosilanes of the general formulae

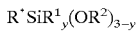

and

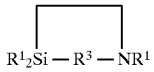

and wherein R* is an amine functional group; $R^1$ is independently selected from alkyl groups having from 1 to 6 carbon atoms and aryl groups having from 6 to 10 carbon atoms; $R^2$ is an alkyl group having from 1 to 4 carbon atoms; and $R^3$ is an alkylene group having from 2 to 10 carbon atoms and y has a value of 0 to 2.

7. The method as claimed in claim 1 wherein the aminosilane is present in an amount of 0.1 to 10 wt % based on the total weight of the emulsion.

8. The method as claimed in claim 1 wherein the aminosilane is selected from the group consisting of aminopropyltrimethoxysilane, aminopropylmethyldiethoxysilane, aminoethylaminoisobutylmethyldimethoxysilane, aminohexylaminopropylmethyldimethoxysilane, N-(cyclohexyl)aminopropyl methyldimethoxysilane and 1,1,2,4-tetramethyl-1-sila-2-azacyclopentane.

9. The method as claimed in claim 8 wherein the aminosilane is aminopropyltrimethoxysilane.

10. The method as claimed in claim 8 wherein the aminosilane is aminopropylmethyldiethoxysilane.

11. The method as claimed in claim 8 wherein the aminosilane is aminoethylaminoisobutylmethyldimethoxysilane.

12. The method as claimed in claim 8 wherein the aminosilane is aminohexylaminopropylmethyldimethoxysilane.

13. The method as claimed in claim 8 wherein the aminosilane is N-(cyclohexyl)aminopropyl methyldimethoxysilane.

14. The method as claimed in claim 8 wherein the aminosilane is 1,1,2,4-tetramethyl-1-sila-2-azacyclopentane.

15. The method as claimed in claim 1 wherein there is additionally and at least one nonionic surfactant present during the emulsion polymerization.

16. The method as claimed in claim 1 wherein the surfactant is present at a level of from 0.05 wt % to 30 wt % based on the total weight of the emulsion.

17. The method as claimed in claim 1 wherein the catalyst is present at a level of from 0.01 to 30 weight percent based on the total weight of the cyclosiloxane and aminosilane.

18. The method as claimed in claim 1 where the water is present at a level to give a amino-functional polysiloxane concentration of 10 to 70 weight percent based on the total weight of the emulsion.

19. The emulsion produced by the method as claimed in claim 1.

20. The emulsion produced by the method as claimed in claim 15.

21. An emulsion composition comprising (A) 10 to 70 weight percent based on the total weight of the emulsion composition of an amino-functional polymer produced by polymerization of a cyclosiloxane and N-(cyclohexyl)aminopropyl methyldimethoxysilane;

(B) 0.5 to 30 weight percent based on the total weight of the emulsion of a cationic surfactant; and (C) water.

22. The emulsion composition as claimed in claim 21 wherein there is additionally present a nonionic surfactant such that the total amount of surfactant is from 0.5 to 30 weight percent based on the total weight of the emulsion composition.

23. An emulsion composition comprising (A) 10 to 70 weight percent based on the total weight of the emulsion composition of an amino-functional polymer produced by polymerization of a cyclosiloxane and 1,1,2,4-tetramethyl-1-sila-2-azacyclopentane;

(B) 0.5 to 30 weight percent based on the total weight of the emulsion of a cationic surfactant; and (C) water.

24. The emulsion composition as claimed in claim 23 wherein there is additionally present a nonionic surfactant such that the total amount of surfactant is from 0.5 to 30 weight percent based on the total weight of the emulsion.

25. An emulsion composition comprising (A) 10 to 70 weight percent based on the total weight of the emulsion composition of an amino-functional polymer produced by polymerization of a cyclosiloxane and aminohexylaminopropylmethyldimethoxysilane;

(B) 0.5 to 30 weight percent based on the total weight of the emulsion of a cationic surfactant; and (C) water.

26. The emulsion composition as claimed in claim 25 wherein there is additionally present a nonionic surfactant such that the total amount of surfactant is from 0.5 to 30 weight percent based on the total weight of the emulsion composition.

* * * * *